United States Patent [19]

Simmering et al.

[11] Patent Number: 5,690,827
[45] Date of Patent: Nov. 25, 1997

[54] SEWAGE TREATMENT SYSTEM USING PEAT AND A CONSTRUCTED WETLAND

[76] Inventors: Stephen G. Simmering, 689 Broadview Avenue, Ottawa, Ontario, Canada, K2A 2L9; Dennis Martin, 14E Knollsbrook Avenue, Nepean, Ontario, Canada

[21] Appl. No.: 545,029

[22] Filed: Oct. 19, 1995

[30] Foreign Application Priority Data

Dec. 29, 1994 [CA] Canada ................... 2139247

[51] Int. Cl.⁶ .................. C02F 3/04; C02F 3/32
[52] U.S. Cl. ............... 210/602; 210/615; 210/619; 210/747; 210/170; 210/258; 210/259; 210/265; 210/906
[58] Field of Search ............... 210/602, 615, 210/616, 617, 669, 691, 743, 747, 96.1, 170, 258, 259, 265, 283, 284, 290, 502.1, 906

[56] References Cited

U.S. PATENT DOCUMENTS

| | | | |
|---|---|---|---|
| 3,790,370 | 2/1974 | Lalancette et al. | 75/108 |
| 3,835,042 | 9/1974 | Lalancette et al. | 210/28 |
| 4,415,450 | 11/1983 | Wolverton | 210/602 |
| 4,839,051 | 6/1989 | Higa | 210/602 |
| 5,017,040 | 5/1991 | Mott | 210/170 |
| 5,049,265 | 9/1991 | Boyd et al. | 210/615 |
| 5,057,227 | 10/1991 | Cohen | 210/747 |
| 5,108,614 | 4/1992 | Ross et al. | 210/669 |
| 5,137,625 | 8/1992 | Wolverton | 210/602 |
| 5,174,897 | 12/1992 | Wengrzynek | 210/602 |
| 5,322,035 | 6/1994 | Hawes et al. | 119/227 |
| 5,437,786 | 8/1995 | Horsley et al. | 210/602 |
| 5,486,291 | 1/1996 | Todd et al. | 210/617 |

FOREIGN PATENT DOCUMENTS

| | | |
|---|---|---|
| 75685 | 10/1901 | Canada . |
| 1019851 | 10/1977 | Canada . |
| 1143684 | 3/1983 | Canada . |
| 1240631 | 8/1988 | Canada . |
| 2074952 | 11/1991 | Canada . |

*Primary Examiner*—Neil McCarthy
*Assistant Examiner*—Theodore M. Green
*Attorney, Agent, or Firm*—Morgan, Lewis & Bockius LLP

[57] ABSTRACT

A system and method of sewage treatment which comprises the sequential steps of:

(i) subjecting waste water to be treated to a primary settling means to remove settleable solids and suspended solids and produce settled effluent;
(ii) passing the settled effluent through a peat filter; and
(iii) collecting the effluent from the peat filter and passing it through a sub-surface constructed wetland.

23 Claims, 3 Drawing Sheets

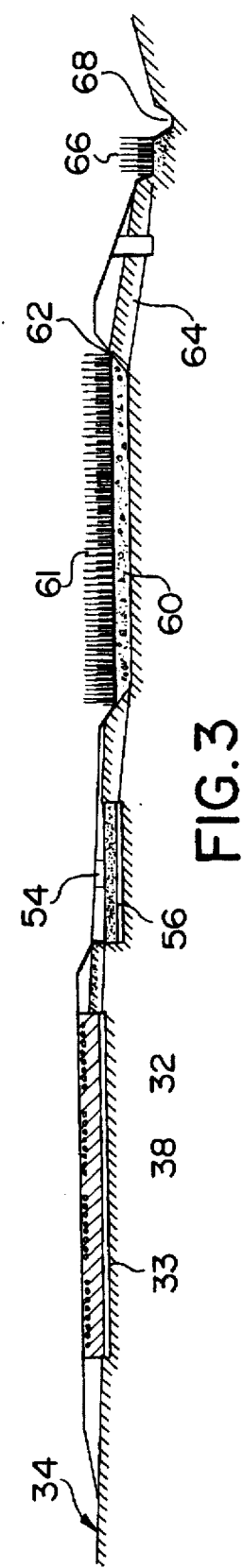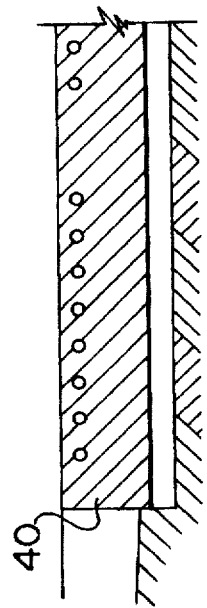
FIG. 3
FIG. 3A
FIG. 4

SEWAGE TREATMENT SYSTEM USING PEAT AND A CONSTRUCTED WETLAND

BACKGROUND OF THE INVENTION

This invention relates to a sewage treatment system which uses peat moss for secondary treatment and a constructed wetland for tertiary treatment. Primary treatment is provided by a solids settling chamber or septic tank prior to distribution in the peat filter. Peat filters have been found to be highly effective for filtering wastewater for both viral and bacterial fractions. The peat filter in and of itself represents a biological community of various types of fungi and microorganisms capable of breaking down organic matter in wastewater.

The peat filter provides a high level of wastewater treatment through physical, chemical and biological processes. Significant reductions of organic carbon, nitrogen, phosphorous, suspended solids, trace metals, and the aforementioned microorganisms can be achieved in the filter. Treatment efficiency is higher in cooler environments due to the significant role of fungi in the treatment process. The filter tends to reduce the pH and increase the dissolved oxygen of the wastewater passing through it. The subsequent constructed wetland component will operate more efficiently with the high influent dissolved oxygen and provide a buffer to help neutralize the lower pH influent. Wetlands are highly effective in filtering suspended solids, organic materials, and nutrients from the water which flows through them. Recently, man made wetlands, or constructed wetlands, have been built to treat a variety of effluents. They are simple yet effective tools and are presently being used to treat domestic, agricultural, industrial and even mining wastewaters. In natural wetlands it is usual for over ninety percent (90%) of the water flow passing therethrough to only flow through small channels. However, the flow through a constructed wetlands can be controlled so that the water is evenly distributed amongst the plants growing therein. By controlling the flow through the constructed wetland the natural filtration and decomposition processes in the wetland function at high efficiency to clean wastewater which has been diverted into the system.

Wastewater, after treatment in the peat filter is directed to a constructed wetland. The wastewater is allowed to either flow on top of the existing soil surface (overland flow) or through a porous medium such as gravel (sub-surface flow). The flow is distributed across the entire width of the constructed wetland which is usually built in the shape of a rectangular cell in a shallow depression having a gravel bottom. A waterproof liner is often used on the sides and bottoms of the cell to prevent penetration of the wastewater flow into ground waters beneath the cell and also to ensure adequate water supply for the wetland floor. The constructed wetland cell is generally planted with common wetland plants indigenous to local wetland habitats, but usually includes such species as reeds (Phragmites), cattails (Typha) and bullrushes (Scirpus). The roots of the plants in the constructed wetland grow to form a dense root mat. In the root mat area chemical, biological and physical processes occur which treat the wastewaters passing through the wetland cell.

The root mat encompasses the interaction of the roots of the reed plants, various species of bacteria, soil, air, sun and water. Plants such as the common reed (*Phragmites communis*) conduct oxygen through their stems into the root system, optimal conditions for the growth of bacteria are thus created. These bacteria oxidize impurities in the wastewater and, because this process occurs underground, aerobic and anaerobic oxidation zones are created side-by-side providing different types of chemical reactions and balanced bacterial growth. Trace metals are absorbed by plants and also precipitate from solution and are deposited in the soil matrix. Phosphates, sulphur and nitrogen are removed from the wastewater and reduced to elemental forms.

Water levels are controlled in both surface and sub-surface systems within the constructed wetland. In sub-surface systems the normal water level is kept 3 cm to 4 cm below the soil surface as this is the most effective in treating the wastewater and also has the advantage of reducing the incidence of insect vectors, which is an important consideration when the wetland is close to an inhabited area.

Constructed wetlands can be operated year round. At the end of the growing season, the above ground vegetation dies but remains standing until new sprouts appear in the spring. Thus oxygen is available for the roots even in Northern winters.

Constructed wetlands are presently in use for small towns and rural areas which often lack central wastewater treatment systems. They have many advantages over constructed wastewater treatment facilities since they require low maintenance, they are long lasting, clean and efficient, winter hardy, and require no outside energy to operate. Moreover, they are inexpensive to operate. Constructed wetlands alone are, however, not always sufficient to meet high water quality standards. The major drawback with constructed wetlands alone is the limited ability for the roots to transfer the necessary oxygen to the liquid.

The higher level of dissolved oxygen provided by filtration through the peat will significantly improve the treatment efficiency of the constructed wetland.

Sand filtration can be used, as an alternative, directly below the peat filter, between the peat filter and the constructed wetland, and/or after the constructed wetland, to further improve treatment, particularly for phosphorous reduction, to meet discharge criteria in specific jurisdictions.

SUMMARY OF THE INVENTION

Accordingly, the invention herein comprises a method of sewage treatment comprising the sequential steps of:

(i) subjecting wastewater to be treated to primary settling to remove settleable solids and suspended solids and produce settled effluent;

(ii) passing the settled effluent through a peat filter; and (iii) collecting the effluent from the peat filter and passing it through a sub-surface constructed wetland.

The invention also comprises a system for sewage treatment which comprises a primary settling means, a peat filter, and a sub-surface constructed wetland, means for passing settled effluent from the primary settling means to the peat filter and from the peat filter to the sub-surface constructed wetland.

BRIEF DESCRIPTION OF THE DRAWINGS

These and other objects and advantages of the invention will become apparent upon reading the following detailed description and upon referring to the drawings in which:

FIG. 3 is a side view of the peat-constructed wetland treatment system;

FIG. 3A is a side view of one alternative embodiment of the treatment system of FIG. 3;

FIG. 4 is a sectional view of the peat filter; and

While the invention will be described in conjunction with illustrated embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE PREFERRED EMBODIMENTS

Figure 1:
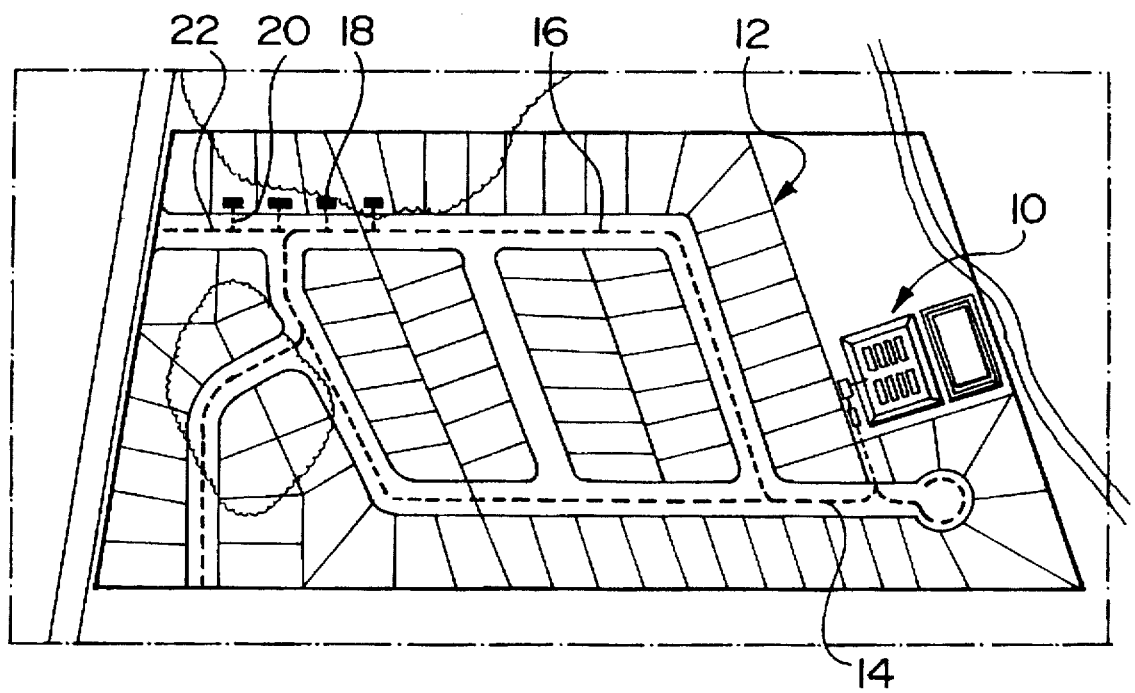
FIG. 1 is a plan view of the peat-constructed wetland treatment system within a housing community.

As shown in FIG. 1 a peat-constructed wetland wastewater treatment system 10 is located adjacent to a wastewater source 12, such as a residential housing development, having a wastewater collection network 14 comprising sewer pipes 16. Individual point sources of wastewater 18, such as houses, are connected to the collection network 14 by supply pipes 20 and septic tanks 22.

Figure 2:
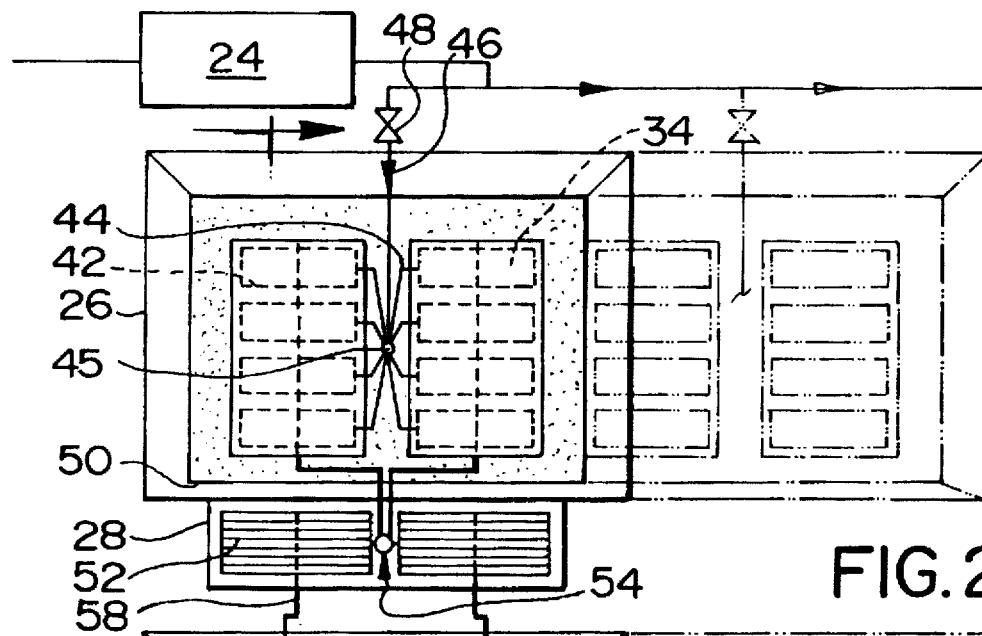
FIG. 2 is a plan view of one embodiment of the peat-constructed wetland treatment system and demonstration of the potential for expansion.
Figure 2:
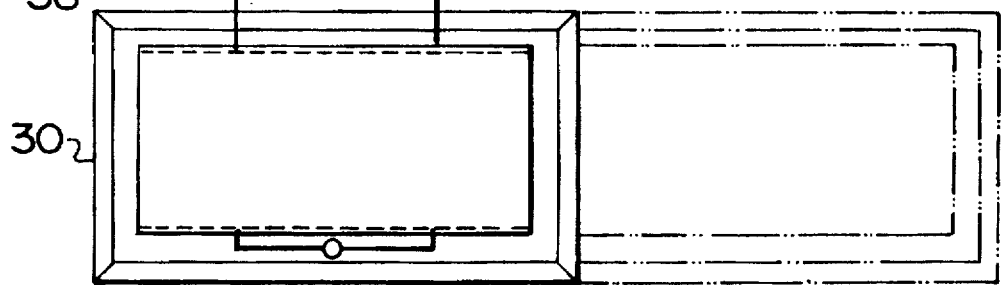

Referring to FIG. 2 the treatment system 10 comprises a balancing tank and pump station 24, peat cell module 26, porous media filtration cell module 28 (optional), and wetland cell module 30. The treatment system 10 also comprises a primary settling means which may be the septic tanks 22 or a communal septic tank at the end of the collection network 14. Each of the aforementioned cell modules is constructed in a shallow depression 32 excavated in the soil surface 34. The depressions 32 have collection beds 33 which may be materials such as plastic, gravel, sand or crushed stone. The interface at 32 may be unlined or lined with a lining material. Whether or not the depressions are to be lined is influenced by a number of factors, including the type of effluent being treated, local discharge quality requirements, local soil conditions (native soils may provide adequate restriction to flow), drainage patterns and the like. For example, where particularly concentrated effluents are being treated (which require treatment by each stage of the process) an impermeable lining in the depression would be preferable. The elevation of each of the succeeding depressions decrease in the direction of the natural drainage pattern of the area in which the system 10 is constructed. (Standard low lift pumps may be used if the drop in elevation is not possible.)

The peat cell module 26, or peat moss filter, comprises one or more peat filter cells 34 comprised of compacted peat 40 which has within its body perforated effluent spreader pipes 42. The spreader pipes 42 are connected by supply pipes 44 to a means of dividing or splitting flow 45, to a peat module in flow pipe 46 which connects the module to balancing tank and/or pump station 24 via flow control pressure valve 48.

The porous media filter 28 (optional), is constructed at a lower elevation than the peat module 26 to which it is connected by an inflow pipe 50. The inflow pipe 50 is connected to perforated effluent spreader pipes 52 via a distribution box 54. The perforated pipes 52 are situated within a body of sand or crushed limestone 56 above the filter 28, to allow the flow to be dispersed throughout the filter. The filter can also be located after the wetland module 30 depending on specific site conditions and treatment requirements.

The wetland module 30, or subsurface constructed wetland, is constructed at a lower elevation than the filter 28 to which it is connected by one or more inflow pipes 58. The wetland module 30 is comprised of a wetland plant growing media 60, such as soil, vermiculite, sand, gravel, crushed stone, etcetera, for plant species 61. The media 60 may be covered with a hardwood chip insulating blanket 62. A wetland outflow pipe 64 connects the wetland module to a discharge wetland 66 (optional), or to a stream or ditch 68 which is part of the natural drainage network in the area where the treatment system is located. In an alternative embodiment of the invention the wetland outflow pipe 64 may be connected to a secondary filter module 70 which in turn is connected to a subsurface soil distribution pipe 72, to avoid direct discharge into the drainage network.

Figure 5:
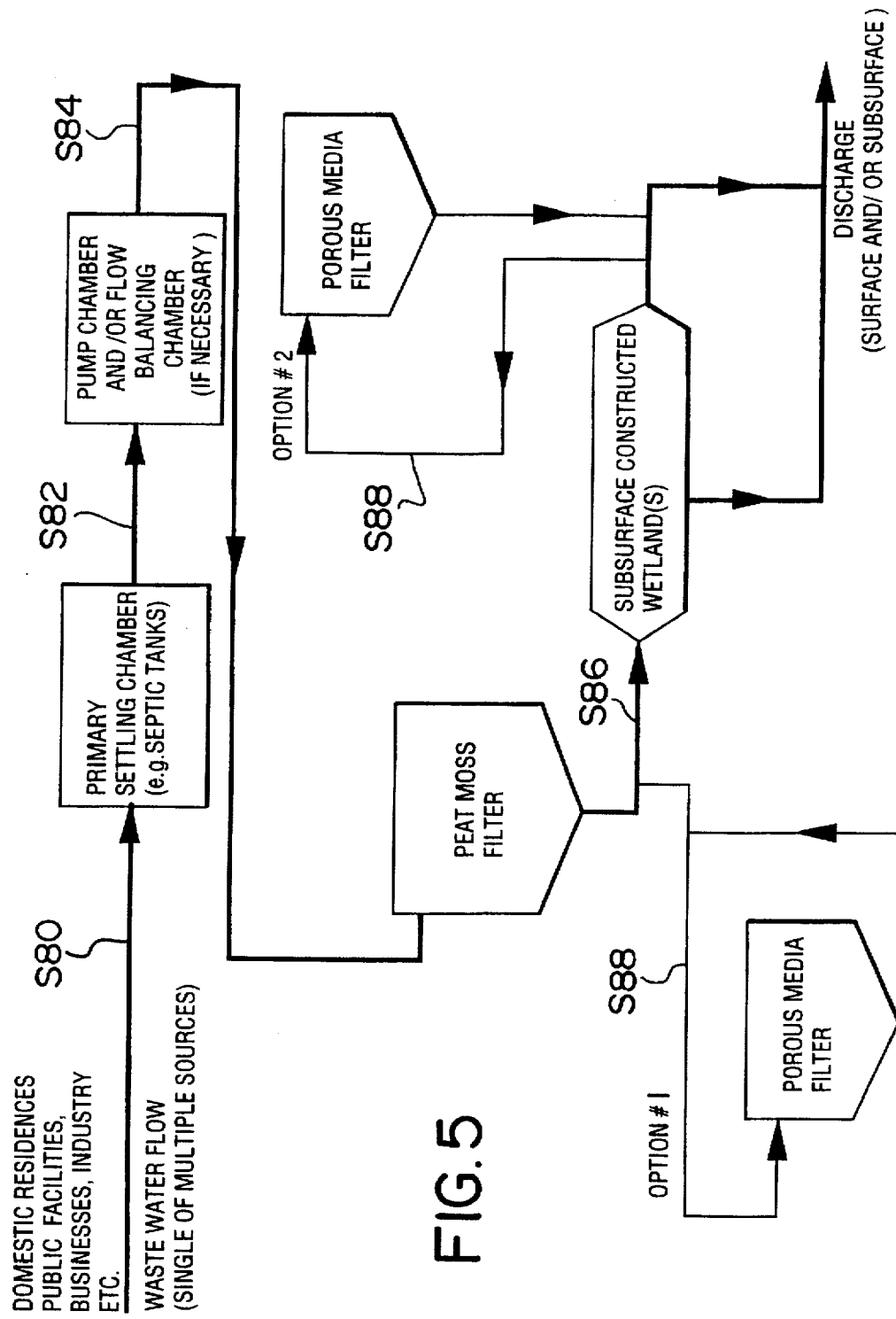
FIG. 5 is a flow chart of the peat-constructed wetland treatment system.

Referring to FIG. 5 the sewage effluent treatment of the present invention consists of three stages of treating the water and also an optional fourth. In the first stage, wastewater is collected using a gravity or pressure collection network from single or multiple sources, for example, from individual residences, public facilities, businesses, industry and the like. The wastewater is directed to a primary settling chamber (for example a traditional septic tank), to remove the bulk of the settleable solids and some suspended solids S80. The primary settling chamber can be located at either the individual residences or, as previously mentioned, a larger communal tank can be used at the end of the sewer collection system. Next the settled effluent enters S82 a pump chamber for delivery to the treatment system and permit balancing or equalization of flows, if this is required. The chamber can also be used for chemical treatment of the effluent if this should be necessary for particular types of effluent. Thus the first stage consists of collecting, settling and distributing the effluent.

Stage 2 consists of peat filtration. The settled effluent is distributed S84 using gravity flow through the spreader pipes to the peat moss filter cell (peat module) S84. The settled effluent travels by the influence of gravity through a layer of compacted peat to a collection area located immediately below which transmits the fluid to the next treatment stage. The peat filter surface area is dependent on the site specific flow and the standard hydraulic considerations of the compacted peat.

Stage 3 is a constructed wetland treatment stage in which effluent from the peat filter is directed to the constructed wetland, S86. The effluent is dispersed into the conductive materials in the constructed wetland and collected at the end by a perforated pipe collection system and then discharged as surface water or allowed to disperse in the soils below the wetland (unlined).

The peat filter of the present invention provides excellent sewage treatment including the removal of bacterial and vital components of the wastewater, BOD, nitrogen and solids removal. Phosphorous can also be removed by the peat filter. Treatment efficiency varies seasonally with highest efficiencies achieved during cooler temperatures. In the constructed wetland one of its primary functions is to reduce the acidity or pH of the peat effluent. The wetland further reduces the BOD, nutrients, nitrogen, phosphorous and suspended solids from the peat effluent. The surface area, depth, and media are dependent on standard hydraulic considerations, first order decay (BOD), nutrient loading and various other critical contaminants that vary with sewage source. The efficiency of the constructed wetland is reduced during winter months due to reduced plant activity. This, however, complements the higher treatment efficiency of the peat filter during the cooler periods thus providing a seasonally stable high quality of water effluent departing the system year round.

An optional operation module which is a porous media filter can be added between the peat module and the constructed wetland module or, alternatively, after the constructed wetland module to further improve the filtration of effluent and in particular enhance removal of phosphates therefrom, S88. The porous media filter can also be incorporated directly below the peat filter in the form of multiple layers.

Thus it is apparent that there has been provided a sewage treatment system that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A method of sewage treatment comprising the sequential steps of:
   (i) subjecting waste water to be treated to primary settling to remove settleable solids and suspended solids and produce settled effluent;
   (ii) passing the settled effluent through an aerobic filter medium consisting entirely of sphagnum peat; and
   (iii) collecting the aerated aerobic effluent from the peat filter and passing it through a sub-surface constructed wetland, which exposes the aerated aerobic effluent to anaerobic conditions prior to discharge.

2. A method according to claim 1 comprising a further step of passing the settled effluent through a porous media filter for further filtration, adsorption of phosphate and adjustment of the pH, as required, prior to passing it through the wetland.

3. A method according to claim 2 wherein effluent from the peat filter is passed through the porous media filter and the effluent from the porous medium filter is passed through the sub-surface constructed wetland.

4. A method according to claim 2 wherein the effluent, after passing through the sub-surface constructed wetland is passed through the porous media filter.

5. A method according to claim 2 wherein the media for the porous media filter is at least one material selected from the group consisting of pit run, gravel, sand, crushed stone, graded sand, ceramic, clay pellets, or clay.

6. A method according to claim 1 wherein the peat filter comprises a peat bed.

7. A method according to claim 6 wherein the bed is about 1 m in thickness and the settled effluent from the primary settling step is passed through the bed by gravity flow.

8. A method according to claim 1 wherein the sub-surface constructed wetland comprising a depression filled with porous media permitting effluent flow and supporting the growth of wetland plant life.

9. A method according to claim 8 wherein the plant life consists of one or more species and is selected from the group consisting of phragmites, cattails and bulrushes.

10. A method according to claim 9 wherein the effluent passed through the sub-surface constructed wetland is discharged to soils below the wetland.

11. A method according to claim 9 wherein the effluent passed through the sub-surface constructed wetland is collected for surface discharge.

12. A method according to claim 9 wherein effluent passed through the sub-surface constructed wetland is passed through a porous media filter and discharged to surface or the soil below.

13. A method according to claim 9 wherein the effluent passed through the sub-surface constructed wetland is discharged to soils below the wetland as well as surface discharge.

14. A system for sewage treatment comprising a primary settling means, a filter medium consisting entirely of sphagnum peat and a sub-surface constructed wetland in which anaerobic conditions predominate, means for passing settled effluent from the primary settling means to the peat filter and from the peat filter to the sub-surface constructed wetland.

15. A system according to claim 14 further comprising a porous medium filter for further filtration, adsorption of phosphorus and adjustment of effluent pH as required.

16. A system according to claim 15 wherein the porous medium filter is positioned between the peat filter and the sub-surface constructed wetland.

17. A system according to claim 15 wherein the porous medium filter is located after the sub-surface constructed wetland.

18. A system according to claim 15 wherein the medium for the porous medium filter is at least one material selected from the group consisting of pit run, gravel, sand, crushed stone, graded sand, ceramic, clay pellets or clay.

19. A system according to claim 15 wherein settled effluent is delivered to the peat filter through a perforated drainage pipe network in an upper portion of the bed, to disperse the effluent over the surface of the porous medium filter.

20. A system according to claim 15 wherein the porous medium filter is positioned below the peat filter.

21. A system according to claim 14 adapted to treating sewage from multiple sources wherein the primary settling means comprises a primary tank located at each source or at the end of a sewer collection system receiving sewage from each source.

22. A system according to claim 21 further comprising a pump chamber to receive the settled effluent from the primary tank and permit the balancing of sewage flows and/or provide chemical treatment if desired.

23. A system according to claim 14 wherein the peat filter comprises a sphagnum peat bed.

* * * * *